United States Patent [19]
Wines

[11] 3,756,649
[45] Sept. 4, 1973

[54] MOTOR VEHICLE CAMPER UNIT
[76] Inventor: David D. Wines, 25545 Tweed Dr., Franklin, Mich. 48025
[22] Filed: Nov. 1, 1971
[21] Appl. No.: 194,293

[52] U.S. Cl. .............................. 296/23 R, 135/1 A
[51] Int. Cl. ............................................. B60p 3/34
[58] Field of Search ..................... 296/23 R, 23 MC, 296/23; 135/1 A, 3 A, 5 A; 14/72

[56] References Cited
UNITED STATES PATENTS
3,599,651   8/1971   Perry .................................. 135/1 A
1,803,237   4/1931   Crooke ............................... 135/3 A
2,929,655   3/1960   Hurter ..................................... 14/72

*Primary Examiner*—Philip Goodman
*Attorney*—Donnelly, Mentag & Harrington

[57] ABSTRACT

A motor vehicle camper unit which includes a vehicle having a dwelling unit which is provided with an access opening in a wall thereof for entry into said dwelling unit, a self-supporting living enclosure such as a tent provided with an access opening in a wall thereof for entry into said living enclosure, a fabric collar having an inner end attached to said living enclosure around said access opening therein and having an outer end extended outwardly therefrom and into the access opening in the vehicle dwelling unit, and, a releasable retainer means mounted around the inner periphery of the outer end of the collar for holding the collar against the boundary of the access opening in the vehicle dwelling unit so as to form a weather-tight seal with the dwelling unit to provide a combination vehicle and living enclosure structure that forms a single dwelling structure.

6 Claims, 15 Drawing Figures

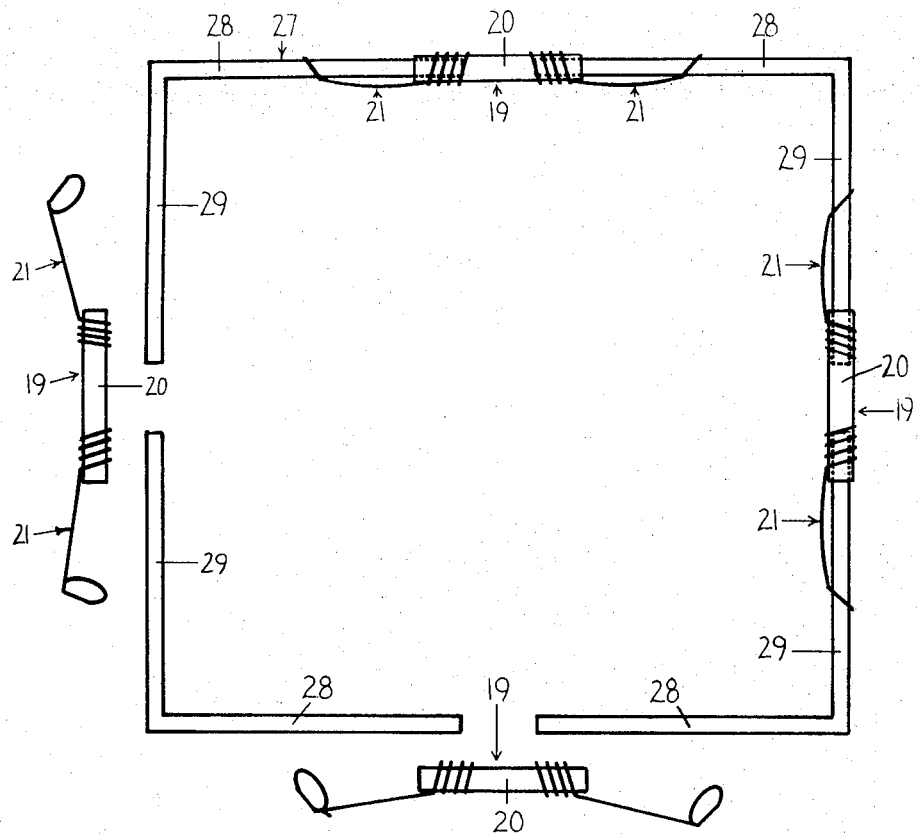
FIG.10
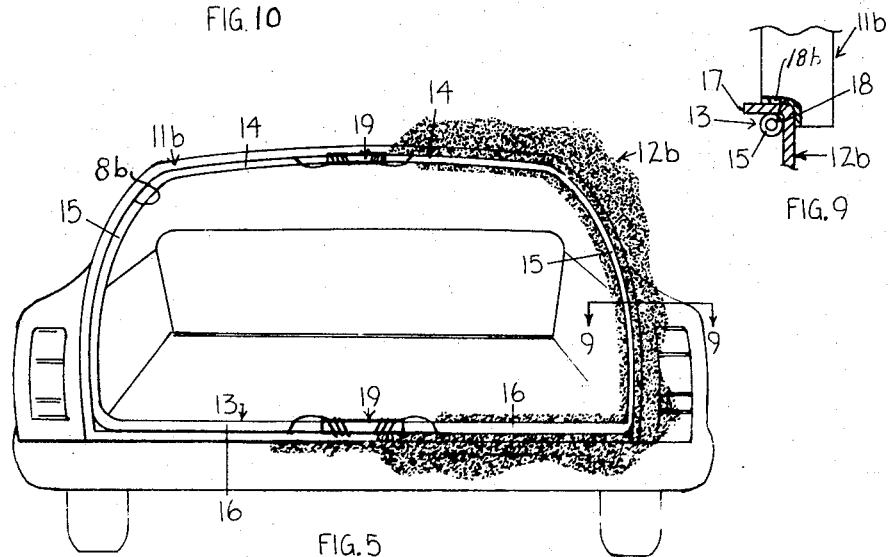
FIG.9
FIG.5
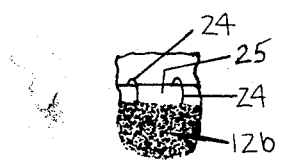
FIG.8

PATENTED SEP 4 1973 3,756,649
SHEET 3 OF 3
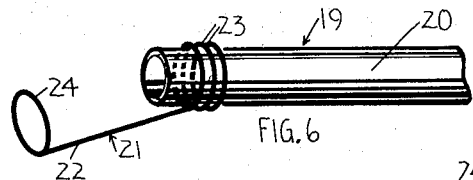
FIG. 6
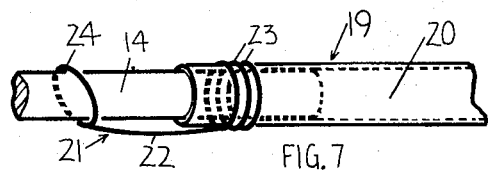
FIG. 7
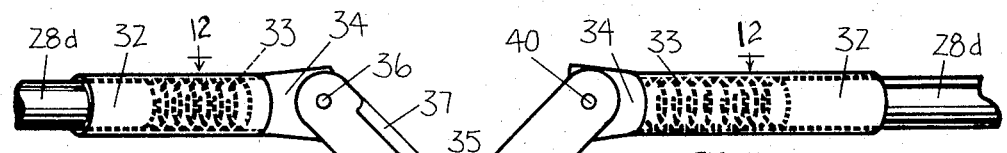
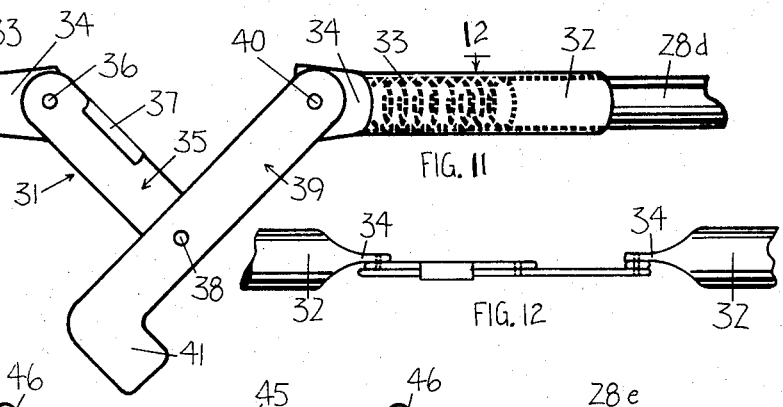
FIG. 11
FIG. 12
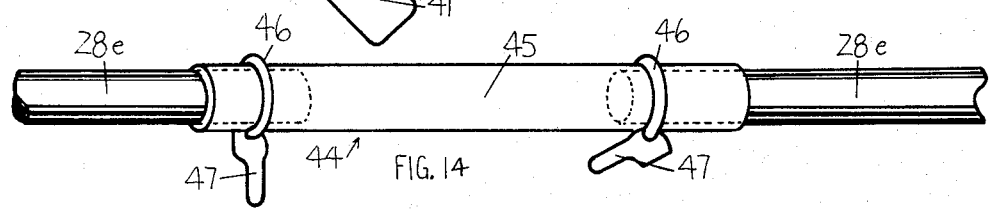
FIG. 14
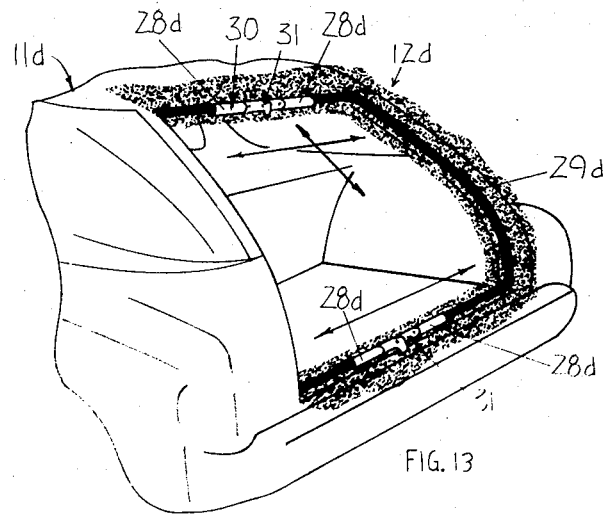
FIG. 13

MOTOR VEHICLE CAMPER UNIT

SUMMARY OF THE INVENTION

This invention relates generally to camper units, and more particularly, to a novel and improved motor vehicle camper unit.

Many types of camper units have been provided heretofore which include a combination of a motor vehicle and a tent structure. However, the prior art motor vehicle tent camper units have many disadvantages. For example, the tent structure in such prior art units is not self-supporting and must be supported by the vehicle, and it must be used at all times in conjunction with the vehicle so that the vehicle is not available for transportation purposes when needed. Accordingly, it is an important object of the present invention to provide a novel and improved motor vehicle camper unit which overcomes the aforementioned disadvantages of the prior art vehicle tent camper units.

It is another object of the present invention to provide a novel and improved motor vehicle camper unit which includes a self-supporting living enclosure, such as a tent, which when in an operative position, forms a weather-tight, integral and interlocking shelter with a dwelling unit of a motor vehicle camper.

It is still another object of the present invention to provide a novel and improved living enclosure or tent for a motor vehicle camper unit which is economical to manufacture, light in weight, self-contained for storage on the roof of a vehicle, or in a vehicle, and which in use forms a contiguous shelter with the vehicle. The vehicle may be quickly and easily detached from the living enclosure when the vehicle is needed for transportation purposes, because the living enclosure is self-supporting and is detachably connected to the vehicle by a collar and a releasable retainer means.

It is a further object of the present invention to provide a motor vehicle camper unit which includes a vehicle having a dwelling unit which is provided with an access opening in a wall thereof for entry into said dwelling unit, a self-supporting living enclosure such as a tent provided with an access opening in a wall thereof for entry into said living enclosure, a fabric collar having an inner end attached to said living enclosure around said access opening therein and having an outer end extended outwardly therefrom and into the access opening in the vehicle dwelling unit, and, a releasable retainer means mounted around the inner periphery of the outer end of the collar for holding the collar against the boundary of the access opening in the vehicle dwelling unit so as to form a weather-tight seal with the dwelling unit to provide a combination vehicle and living enclosure structure that forms a single dwelling structure.

Other features and advantages of this invention will be apparent from the following detailed description, appended claims, and the accompanying drawings.

BRIEF DESCRIPTION OF THE DRAWINGS

FIG. 5 is a fragmentary, elevational section view of the station wagon camper unit structure illustrated in FIG. 3, taken substantially along the line 5—5 thereof, looking in the direction of the arrows, and illustrating a first type of releasable retainer means.

FIG. 6 is a fragmentary, perspective view of one end of a first type of releasable retainer expandible means employed in the invention.

FIG. 7 is a view similar to FIG. 6, and showing the retainer expandible means of FIG. 6 attached to a member of the frame of the releasable retainer means.

FIG. 8 is an enlarged, fragmentary view of the structure illustrated in FIG. 3, taken along the line 8—8 thereof, and looking in the direction of the arrows.

FIG. 9 is a fragmentary, horizontal section view of the structure illustrated in FIG. 5, taken along the line 9—9 thereof, and looking in the direction of the arrows.

FIG. 10 is an elevational view of a second type of releasable retainer means employed in the invention, and showing some of the parts thereof in a disassembled condition.

FIG. 11 is a fragmentary, elevational view of a portion of a releasable retainer means made in accordance with the principles of the invention and provided with a second type of expandible means.

FIG. 12 is a fragmentary, top plan view of the expandible means illustrated in FIG. 11, taken along the line 12—12 thereof, and looking in the direction of the arrows, and showing the levers in a locked position.

FIG. 13 is a fragmentary, elevational perspective view of the back end of a second station wagon camper unit structure, and showing a releasable retainer means provided with a third type of expandible means.

FIG. 14 is a fragmentary, elevational view of the releasable retainer means illustrated in FIG. 13, and showing an enlarged view of the expandible means employed in said retainer means.

DESCRIPTION OF THE PREFERRED EMBODIMENT

Figure 1:
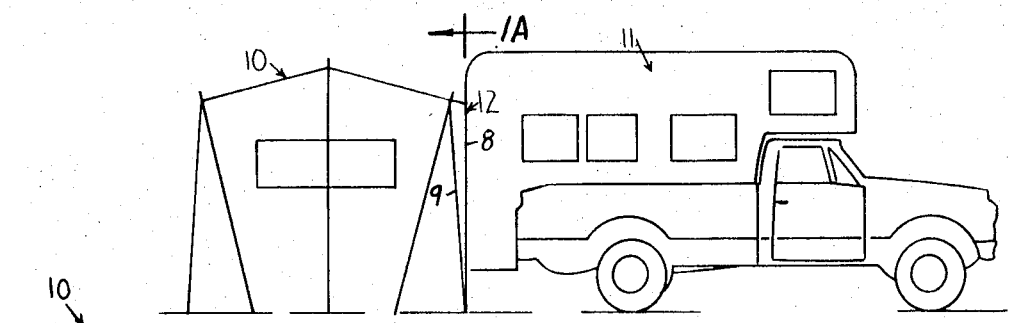
FIG. 1 is a side elevational view of an illustrative pick-up truck camper unit made in accordance with the principles of the present invention.
Figure 1A:
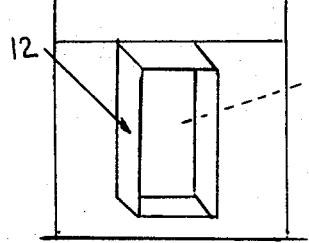
FIG. 1A is an elevational section view of the structure illustrated in FIG. 1, taken along the line 1A—1A thereof, and looking in the direction of the arrows.

Referring now to the drawings, and in particular to FIG. 1, wherein is shown an illustrative embodiment of the invention, the numeral 10 generally designates a living enclosure, such as a tent or a screen house, which is provided with an access opening 9 (FIG. 1A) in one of the side walls thereof. The numeral 11 generally designates a pick-up truck camper unit having a dwelling unit or dwelling portion which is provided with an access opening 8 in the rear end thereof. A fabric collar 12 has an inner end operatively attached to said living enclosure 10, around said access opening 9. The collar 12 extends outwardly from the living enclosure and has an outer end extended into the access opening 8 in the vehicle dwelling unit. A releasable retainer means, which is disclosed and described in detail hereinafter, is mounted around the inner periphery of the outer end of the collar for holding the collar against the boundary of the access opening 8 in said dwelling unit, so as to form a weather-tight seal with the dwelling unit to provide a combination vehicle and living enclosure structure that forms a single dwelling structure. It will be understood that the living enclosure 10 may have a shape other than that illustrated in FIG. 1.

Figure 2:
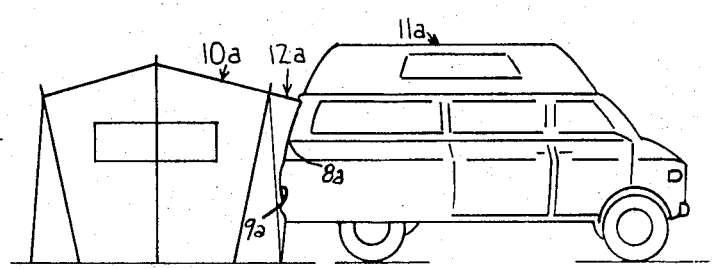
FIG. 2 is a side elevational view of an illustrative panel truck camper unit made in accordance with the principles of the present invention.

FIG. 2 is a side elevational view of an illustrative panel truck camper unit provided with a tent and interconnecting fabric collar structure of the same construction as illustrated in FIG. 1, and the corresponding parts thereof have been marked with the same reference numerals followed by the small letter a.

Figure 3:
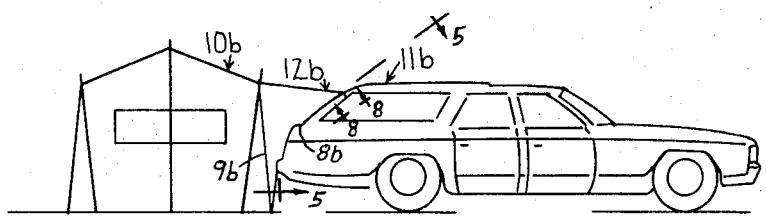
FIG. 3 is a side elevational view of a station wagon camper unit made in accordance with the principles of the present invention.

FIG. 3 is a side elevational view of a first station wagon camper unit provided with a tent and interconnecting fabric collar structure of the same construction as illustrated in FIG. 1, and the corresponding parts thereof have been marked with the same reference numerals followed by the small letter b.

Figure 4:
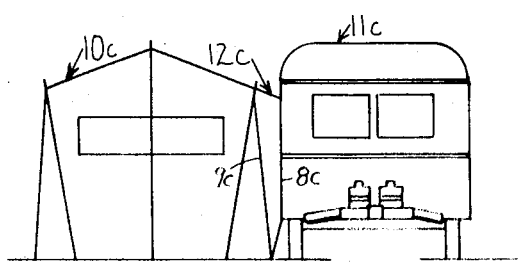
FIG. 4 is an end elevational view of a travel home camper unit made in accordance with the principles of the present invention.

FIG. 4 is an end elevational view of a travel home camper unit provided with a tent and interconnecting fabric collar structure of the same construction as illustrated in FIG. 1, and the corresponding parts thereof have been marked with the same reference numerals, followed by the small letter c.

It will be understood that although the living enclosure is illustrated as being a tent, it could also be some other type of living enclosure, as for example, a screened-in enclosure, and the like. The fabric collar 12 is made to a length necessary to clear any obstruction between the tent 10 and the vehicle dwelling unit structure to which it is to be joined. As illustrated in FIGS. 1 through 4, the side elevational views of the various illustrated collars show that the collar 12 would in each embodiment be provided with a shape that would conform to the elevational configuration of the side of the vehicle dwelling unit as well as to the shape of the access opening 8 of the vehicle dwelling unit. It will also be understood that the access opening 9 in the wall of the tent 10 may be provided with a closure to form an all-weather self-standing dwelling unit when the vehicle 11 is separated from the tent 10. The fabric collar 12 may be made from any suitable material which is effective to form a good weather-tight seal with the vehicle. An optimum weather-tight seal is formed where a suitable weather-stripping is disposed on the surface of the access opening in the vehicle dwelling unit and such weather-stripping is engaged by the collar 12. The material for the fabric collar 12 may be the same material as used in making the tent 10, as for example, a weather-proof canvas, or other material such as rayon, nylon and so forth. The collar 12 is attached to the tent 10 by any suitable method and means, as for example, it may be sewn or heat sealed to the tent 10.

It will also be understood that the collar 12 may be provided with support under the top and along the inner sides thereof to prevent water from collecting on the roof surface of the collar 12, and to cause the water to run off instead of collecting thereon.

FIG. 5 is a fragmentary, elevational section view of the station wagon camper structure illustrated in FIG. 3, and illustrating a first type of releasable retainer means generally indicated by the numeral 13 for releasably securing the fabric collar 12b in the access opening 8b in the rear end or dwelling unit part of the station wagon 11b. It will be understood that the releasable retainer means 13 would be made to fit any contour of the access opening 8b in the most advantageous manner for forming a complete weather-tight seal with the fabric collar 12b. The releasable retainer means 13 is made separate from the collar 12b so that the tent structure can be most easily folded for storage. The releasable retainer means 13, illustrated in FIG. 5, comprises two conforming integral half frame parts which each include a top member 14, a side member 15, and a bottom member 16. It will be seen that the retainer means 13 comprises a frame structure which may be made from any suitable material, as wire, extruded or drawn metal, a suitable plastic material, or a combination of a metal and a plastic material. The frame structure may be of a solid cross section or a tubular cross section. The illustrated retainer frame structure is made from a solid wire rod construction.

As illustrated in FIGS. 5 and 8, the edge 17 of the outer end of the fabric collar 12b is disposed inside of the vehicle access opening 8b, and the releasable retainer means 13 is disposed against the inside surface of the collar 12b so as to expand and press the collar outwardly and into seating engagement, preferably against suitable weather-stripping 18b, on the surface of the stepped periphery 18 of the vehicle opening 8b. The stepped periphery 18 of the vehicle access opening 8b is a portion in which the station wagon gate normally is seated and it extends completely around the opening 8b. The releasable retainer means 13 is provided with a pair of expandible means generally indicated by the numeral 19 which interconnects the ends of the retainer frame top members 14 and the ends of the retainer frame bottom members 16.

As illustrated in FIGS. 5, 6 and 7, the expandible means 19 comprises a sleeve or short tubular member 20, in the ends of which is slidably received the ends of the retainer frame members 14 and 16. The retainer frame members 14 and 16 are held in their respective sleeve 20, in adjusted positions, so as to maintain an outwardly directed bias or pressure against the fabric collar 12b by means of a spring tension means generally indicated by the numeral 21. The spring tension means 21 includes an elongated spring arm 22, on one end of which is integrally formed a plurality of spring coils 23 which are mounted around one end of the tubular sleeve 20 and disposed at an angle so as to maintain a friction grip with the sleeve 20. Integrally formed on the other end of the spring arm 22 is a single coil or wire loop 24 which is also disposed at an angle and over one of the ends of a frame member 14 or 16, as for example, the end of the frame member 14 as illustrated in FIG. 7. The aforementioned angle would be one other than an angle at 90° to the longitudinal axis of the tubular sleeve 20. It will be seen that the frame members 14 and 16 can be slidably mounted in the tubular sleeves 20 and their positions maintained by the spring means 21 which constantly provides an outwardly directed pressure so as to maintain a pressure or force on the fabric collar 12b and hold it in a weathertight position against the stepped periphery 18 of the opening 8b.

As shown in FIG. 8, the fabric collar 12b is provided with suitable attachment hooks 24 which may be formed from any suitable material, as for example, metal wire or plastic material. The hooks 24 may be attached to the fabric 12b by any suitable means, as by a suitable attachment thread, or by mounting the hooks through suitable holes or eyelets in the fabric 12b. The hooks 24 are attached to the molding 25 on the vehicle along the inside of the access opening 8b to hold the collar 12b in a partially formed position to facilitate positioning of the retainer means 13.

FIG. 10 illustrates a modified releasable retainer means which is generally indicated by the numeral 27 and which is made with four frame parts, instead of two frame parts as illustrated in the embodiment of FIG. 5. FIG. 10 also illustrates that the frame of the retainer means may be made in various shapes in accordance with the access opening into the dwelling unit of a vehicle. The access opening in a vehicle dwelling unit for which the illustrated retainer means 27 is provided, would be substantially square. Each of the quarter parts of the retainer frame illustrated in FIG. 10 comprises integral end and side members 28 and 29. The various side and end frame members are adapted to be operatively connected by an expandible means 19, in the same manner as previously described for the embodiment of FIGS. 5 through 9. The releasable retainer means of FIG. 10 operates in the same manner as the embodiment of FIGS. 5 through 9.

FIGS. 11, 12 and 13 illustrate another embodiment of the invention in which a releasable retainer means 30 is shown as being substantially rectangular in elevational configuration, but curved, when viewed from the side, so as to fit into the opening 8d in the illustrated vehicle 11d. The releasable retainer means 30 includes a frame having two frame parts of the type illustrated in FIG. 10, and the same reference numerals have been used followed by the small letter d. An expandible means 31 is illustrated and it comprises a pair of tubular members 32 which each have one end slidably mounted over an adjacent end of one of a pair of frame members, as for example, the ends of two frame members 28d, as shown in FIG. 11. As illustrated in FIGS. 11 and 12, the other end of each of the tubular members 32 are squeezed together to form a flat blade 34. A coil compression spring 33 is mounted inside each of the tubular members 32 and it engages the outer end of the frame member 28d mounted therein.

A first locking lever 35 has an inner end hingedly connected by a suitable hinge pin 36 to one of the flat blades 34. A second locking lever 39 has an inner end thereof hingedly connected by a suitable hinge pin 40 to the other blade 34. The outer end of the first lever 35 is hingedly connected by a hinge pin 38 to the lever 39 at a point spaced apart from the outer end of the lever 39. The outer end of lever 39 is provided with an operating handle 41. A locking shoulder plate 37 is formed on the outer side of the upper edge of the lever 39, whereby when the lever 39 is pivoted upwardly, from the position shown in FIG. 11, to the position shown in FIG. 12, against the plate 37, the retainer means 31 will be in a locked position and the spring means 33 will exert an axially outward directed pressure on the frame members 28d. The structure illustrated in FIGS. 11 through 13 functions in the same manner as the structure illustrated in FIGS. 5 through 9.

FIG. 14 illustrates a third type of releasable retainer means employed in the invention, generally indicated by the numeral 44. The frame members 28e are slidably mounted in the ends of a tubular sleeve 45 and are retained in position by a friction locking ring 46 and a cam member 47. The cam member 47 on the right side of FIG. 14 illustrates this member in a released position. The cam member on the left side of FIG. 14 illustrates this member in a locked position. The frame members 28e would be moved outwardly of the sleeve member 45 to create a retaining pressure on a collar 12 and the cam members 47 would then be pivoted from an unlocked position shown by cam member 47 on the left side of FIG. 14 to a locked position shown by the cam member 47 on the right side of FIG. 14.

While it will be apparent that the preferred embodiments of the invention herein disclosed are well calculated to fulfill the objects above stated, it will be appreciated that the invention is susceptible to modification, variation and change.

What I claim is:

1. In a motor vehicle camper, the combination comprising:
    a. a vehicle having a dwelling unit which is provided with an access opening in a wall thereof for entry into said dwelling unit;
    b. a self-supporting living enclosure provided with an access opening in a wall thereof for entry into said living enclosure;
    c. a fabric collar having an inner end attached to said living enclosure around said access opening therein, said collar extending outwardly from the living enclosure and having an outer end extended into the access opening in the vehicle dwelling unit; and,
    d. a releasable retainer means mounted around the inner periphery of the outer end of the collar for holding the collar against the boundary of the access opening in the vehicle dwelling unit so as to form a weather-tight seal with the dwelling unit.

2. In a motor vehicle camper as defined in claim 1, wherein said releasable retainer means includes:
    a. a frame comprising a plurality of separate parts; and,
    b. a plurality of expandible means for connecting said separate frame parts.

3. In a motor vehicle camper, the combination comprising:
    a. a vehicle having a dwelling unit which is provided with an access opening in a wall thereof for entry into said dwelling unit;
    b. a self-supporting living enclosure provided with an access opening in a wall thereof for entry into said living enclosure;
    c. a fabric collar having an inner end attached to said living enclosure around said access opening therein, said collar extending outwardly from the living enclosure and having an outer end extended into the access opening in the vehicle dwelling unit;
    d. a releasable retainer means mounted around the inner periphery of the outer end of the collar for holding the collar against the boundary of the access opening in the vehicle dwelling unit so as to form a weather-tight seal with the dwelling unit;
    e. said releasable retainer means including,
        1. a frame comprising a plurality of separate parts, and,
        2. a plurality of expandible means for connecting said separate frame parts; and,
    f. said expandible means including,
        1. a tubular sleeve; and,
        2. means for locking a member of a frame part in each end of said tubular sleeve.

4. In a motor vehicle camper as defined in claim 3, wherein:

a. said means for locking a member of a frame part in each end of said tubular sleeve comprises a spring means.

5. In a motor vehicle camper as defined in claim 3, wherein:
   a. said means for locking a member of a frame part in each end of said tubular sleeve comprises a cam locking means.

6. In a motor vehicle camper, the combination comprising:
   a. a vehicle having a dwelling unit which is provided with an access opening in a wall thereof for entry into said dwelling unit;
   b. a self-supporting living enclosure provided with an access opening in a wall thereof for entry into said living enclosure;
   c. a fabric collar having an inner end attached to said living enclosure around said access opening therein, said collar extending outwardly from the living enclosure and having an outer end extended into the access opening in the vehicle dwelling unit;
   d. a releasable retainer means mounted around the inner periphery of the outer end of the collar for holding the collar against the boundary of the access opening in the vehicle dwelling unit so as to form a weather-tight seal with the dwelling unit;
   e. said releasable retainer means including,
      1. a frame comprising a plurality of separate parts, and,
      2. a plurality of expandible means for connecting said separate frame parts; and,
   f. said expandible means including,
      1. a pair of tubular sleeves for receiving a member from each of a pair of frame parts;
      2. a spring means in each of said tubular sleeves for engaging the ends of said frame members mounted therein; and,
      3. a lever operated locking means for urging the tubular sleeves toward the frame members to expand the frame.

* * * * *